United States Patent Office 3,452,036
Patented June 24, 1969

---

3,452,036
PRODUCTION OF 2-SUBSTITUTED BENZOXAZOLES
Henry Peter Crocker, Horsea, England, and William George Clive Raper, Moorabbin, Victoria, Australia, assignors to Monsanto Chemical (Australia) Limited, West Footscray, Victoria, Australia, a company of Australia
No Drawing. Filed Apr. 11, 1966, Ser. No. 541,484
Claims priority, application Australia, Apr. 14, 1965, 57,636/65
Int. Cl. C07d 85/48
U.S. Cl. 260—307                            8 Claims

---

ABSTRACT OF THE DISCLOSURE

A process for producing biologically active 2-substituted benzoxazoles from o-nitrophenol or a nuclear substituted derivative of o-nitrophenol and an aldehyde or a carboxylic acid by passing the reactants in vapor phase together with hydrogen over a catalyst bed of a member of the platinum family of metals.

---

This invention relates to the production of 2-substituted benzoxazoles, which substances have biological activities and are particularly useful as anti-mycotic agents, as well as being useful as optical bleaches.

2-substituted benzoxazoles are usually produced by synthesis from an o-aminophenol by reaction with (a) a carboxylic acid in the presence of a large volume of mineral acid, or by reaction with (b) an aldehyde in the presence of an oxidizing agent such as lead tetraacetate, according to the following equations:

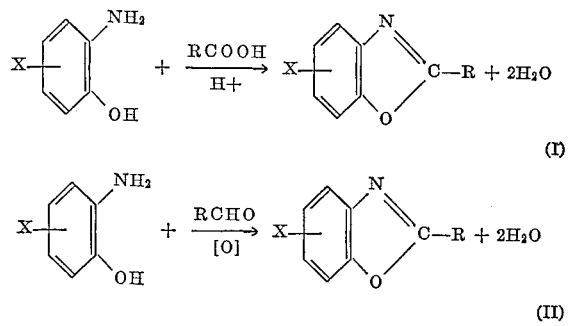

wherein X is hydrogen or a substituent or substituents and R is a group contributed by the selected carboxylic acid or aldehyde. Both reactions suffer from the disadvantage that they require batchwise, liquid-phase operation, and are expensive to operate on a large scale. Moreover, the o-aminophenol raw material is expensive and readily oxidized, and the benzoxazole product which may be obtained in high yield, is often contaminated with tar and difficult to purify. This results in a high cost of manufacture, which, in some cases, limits the use of the benzoxazole.

We have now found that 2-substituted benzoxazoles can be prepared simply and in good yield by reaction of an o-nitrophenol (o-nitrophenol itself or a nuclear-substituted derivative) with an aldehyde or a carboxylic acid or a precursor of either of these materials, under conditions of catalytic hydrogenation, in which the hydrogenation catalyst is a member of the platinum family of metals on a suitable catalyst support. We have found that in this way, 2-substituted benzoxazoles can be prepared by an economical, continuous operation, and in a high state of purity, from readily available raw materials.

Thus, in accordance with the present invention, there is provided the process of producing 2-substituted benzoxazoles which comprises a vapor phase reaction of o-nitrophenol or a nuclear-substituted derivative of o-nitrophenol, with an aldehyde or a carboxylic acid or a precursor material which forms an aldehyde or a carboxylic acid under the conditions of the reaction, by passing said reactants in vapor or gaseous phase, together with gaseous hydrogen, over a catalyst bed of a member of the platinum family of metals on a suitable catalyst support, and recovering the 2-substituted benzoxazole reaction product. The reaction according to the process of the invention, employing an aldehyde reactant, may be expressed as shown in the following equation:

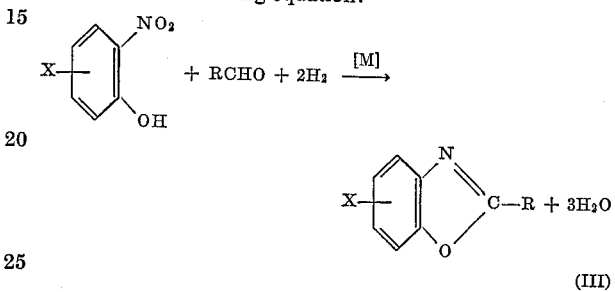

(III)

wherein X is hydrogen or a substituent group or groups the substituent group or groups conveniently being selected from halogen or alkyl or alkoxy, preferably in which the alkyl or alkyl portion of the alkoxy group contains from one to four carbon atoms; R is an alkyl or aryl or aralkyl group, preferably having from 1 to 12 carbon atoms, contributed by the particular aldehyde employed; and M is the metal catalyst selected from ruthenium, rhodium, palladium, osmium, iridium, and platinum. Likewise, the reaction according to the process of the invention, employing a carboxylic acid reactant, may be expressed as shown in the following equation:

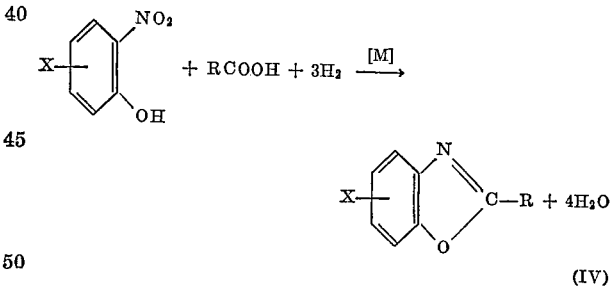

(IV)

wherein X is hydrogen or a substituent group or groups, the substituent group or groups conveniently being selected from halogen or alkyl or alkoxy, preferably in which the alkyl or alkyl portion of alkoxy group contains from one to four carbon atoms; R is an alkyl or aryl or aralkyl group, preferably having from 1 to 12 carbon atoms, contributed by the particular carboxylic acid employed; and M is the metal catalyst selected from ruthenium, rhodium, palladium, osmium, iridium, and platinum.

In general, the process of the invention is carried out by bringing the specified components together in the vapor phase at a temperature of 230–450° C., preferably 300–350° C. We have found that at higher temperatures side reactions tend to set in, while the lower reaction temperature is governed mainly by the need to keep the often high-boiling point products in the vapor phase. In practice, the selected o-nitrophenol and the aldehyde or carboxylic acid reactant conveniently are fed separately or in admixture into a reactor and preferably are vaporized before passing to the catalyst bed. Thus, it is possible to feed reactants in liquid form directly onto the catalyst bed, however, in this instance the first or introductory portion or zone of the catalyst bed would then merely serve as a pre-heating zone for vaporizing the reactants.

The reaction involved in the process of the invention is exothermic and it is desirable to apply cooling to the catalyst bed. This may be achieved by operating the process in a tubular or multitubular reactor embodying the catalyst bed and equipped with a jacket filled with a suitable heat transfer medium such as a fused salt. Instead of employing a fixed catalyst bed, the process may be carried out in a reactor equipped with a fluidized catalyst bed, and also equipped with a heat exchanger arrangement to dissipate the heat of reaction.

Residence or contact time of the o-nitrophenol and aldehyde or carboxylic acid reactant with the catalyst bed is not particularly critical because the reaction products have a high degree of thermal stability, the time being governed largely by reaction temperature and by the type of reactor employed. We have found that when operating with a fixed bed of catalyst and at a jacket temperature of 300° C., an hourly liquid feed/catalyst ratio of unity is suitable, that is to say one volume of liquid feed may be used per volume of catalyst per hour.

Recovery of the desired 2-substituted benzoxazole reaction product from the reactor may be effected by being condensed in conventional equipment and purified by, for example, crystallization. In many cases the reaction products are of a high state of purity, however, they may require washing with a solvent such as benzene to remove small amounts of by-product. When using a fixed bed reactor, we prefer a downward operation since this aids separation of the often high-melting reaction product from the catalyst bed. Under certain conditions using a carboxylic acid reactant, some of the o-nitrophenol feed may appear in the reaction product as the derived o-aminophenol. This may be separated from the benzoxazole portion of the reaction product by virtue of its lower boiling point and higher solubility in organic solvents, and recycled to the reaction. Similarly, any unchanged carboxylic acid may also be separated from the reaction product and recycled to the reaction.

The molar ratio of o-nitrophenol to aldehyde or carboxylic acid reactant normally is unity, but when one reactant is more available than the other, it may be advantageous to use an excess of the cheaper reactant. The mount of hydrogen used is usually in excess of the stoichiometric requirements and constitutes an entraining stream for the reactant thus serving both to help vaporize the o-nitrophenol and aldehyde or carboxylic acid reactant and reaction products and to dissipate the heat of reaction. The excess of hydrogen is usually separated from the products and recirculated. Although pure hydrogen is preferred, inert diluents such as methane or nitrogen may be present without deleterious effect.

Nuclear substituted derivatives of o-nitrophenol, particularly those which result in 2-substituted benzoxazoles having a substituent in the 5- and/or 6-positions of the benzoxazole nucleus, may be employed as a reaction component in carrying out the process of the invention. Examples of such nuclear substituted derivatives are o-nitro-p-cresol; 2-nitro-4-methoxyphenol; 2-nitro-4,5-dimethylphenol; and 2-nitro-4-chlorophenol.

The aldehde reactant may be an aliphatic aldehyde (when R is in Equation III is H or $C_nH_{2n+1}$) with a branched or unbranched carbon chain. Examples are formaldehyde, acetaldehyde, propionaldehyde, isovaleraldehyde and the like. Olefinic aldehydes may also be used, however, the double bond will be hydrogenated in the the course of the reaction. The aldehyde may be an alicyclic aldehyde, for example cyclohexane carboxyaldehyde or heterocyclic aldehydes such as thiophene-2-aldehyde; pyrrole-2-aldehyde; or furfural. Aromatic aldehydes such as benzaldehyde, and nuclear-substituted aldehydes, for example veratraldehyde, p-chlorobenzaldehyde, and 3,4-methylenedioxybenzaldehyde may also be used. Aryl substituted aliphatic aldehydes such as phenylacetaldehyde and substituted phenylacetaldehydes are also useful for the purpose of the invention.

Aldehydes, as such, normally are used in the process of the invention, however, precursors which form an aldehyde under thermal conditions or under thermal conditions and in the presence of a platinum-family metal catalyst, may be used, the aldehyde then being generated in situ. Thus, formaldehyde may be used in the form of a derivative such as 1-hydroxy-2-methylbutan-3-one, which decomposes thermally into formaldehyde and ethylmethyl ketone, the formaldehyde then being the reactant and the ethylmethyl ketone being inert. Similarly, alcohols which dehydrogenate readily in the presence of a platinum-family metal catalyst may also be used as the aldehyde rection component.

The carboxylic acid reactant may be an aliphatic carboxylic acid with a branched or straight carbon chain. Examples are formic, acetic, propionic, isobutyric acids and the like. Olefinic acids may also be used, however, the double bond will be hydrogenated in the course of the reaction. The carboxylic acid can also be an aromatic carboxylic acid (such as benzoic acid) or nuclear-substituted derivatives of aromatic carboxylic acids (such as veratric acid, p-chlorobenzoic acid, and toluic acid). Aryl-substituted aliphatic carboxylic acids (such as phenylacetic acid) can be used also. Heterocyclic carboxylic acids (such as pyridine caboxylic acids and thiophene carboxylic acids) can be used, however, there is a tendency for these carboxylic acids to be lost by thermal decarboxylation. Normally, the carboxylic acid reactant is used as such, however, simple derivatives such as the ester or amide can be so employed, especially ester or amides of the above-named carboxylic acids, since such derivatives function as a carboxylic acid precursor, moreover, such derivatives often have an enhanced thermal stability and thus serve as a useful source of the carboxylic acid reactant.

Although the catalyst metal employed in the catalyst bed is selected from ruthenium, rhodium, palladium, osmium, iridium, and platinum, we prefer to use palladium because of cost and comparative performance. Suitable carriers for the catalyst metal are particles or granules or pellets of alumina, zinc oxide, magnesia, silica, or other refractory oxides including naturally occurring materials such as bauxite, kieselguhr, and activated clays, or granulated carbon silica, brickdust, and like inert materials.

The process of the invention is illustrated by the following non-limitative practical examples:

Example 1

An equimolar mixture of o-nitrophenol and benzaldehyde was fed at a rate of about 0.5 bed volume/hour over a bed of a palladium (0.1% w./w.) on fuller's earth in a tubular reactor (¼ inch internal diameter) held in a bath of fused potassium nitrate/sodium nitrite at 325° C. Hydrogen was simultaneously fed into the reactor at a rate of 6 liters/hour. The effluent from the reactor was cooled and deposited deep yellow crystals. These were recrystallized from ethanol/water, followed by methanol/water to give a good yield of yellow plate-type crystals of 2-phenylbenzoxazole, M.P. 101° C., with infra-red spectrum identical with an authentic sample.

Example 2

A mixture of o-nitrophenol dissolved in acetic acid in the molar ratio of 1:2 was vaporized and fed at a rate of about 0.7 bed volume/hour over a bed of palladium (0.1% w./w.) on fuller's earth in a tubular reactor (¼ inch internal diameter) held in a bath of fused salt at 325° C. Hydrogen was simultaneously fed at a rate of about 6 liters/hour. The effluent from the reactor was cooled to give a two-phase liquid distillate in which the organic bottom layer was yellow and the aqueous layer was clear. Water (20 ml.) was added, dissolving part of the organic layer, and the two phases were then separated. On heating under a vacuum on a steam bath to remove water the organic phase was shown by the infra-red spectrum to be substantially pure 2-methylbenzoxazole. The yield was 70% of theory based on o-nitrophenol fed.

The selectivity of the platinum family of metals in carrying out the catalytic hydrogenation process of the invention was demonstrated by repeating the examples except that a nickel-on-keiselguhr catalyst (70% Ni) was used at a bath temperature of 250–400° C. Extensive degradation of the feed occurred giving ammonia and other breakdown products. No 2-phenylbenzoxazole could be detected. The selectivity was again demonstrated by repeating Example 1 except that a mixed chromium/molybdenum catalyst was employed at 300–350° C. o-Nitrophenol was recovered from the effluent gases and no 2-phenylbenzoxazole could be detected.

We claim:

1. A process which comprises the vapor phase reaction of an o-nitrophenol reactant of the formula

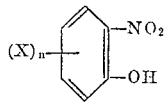

wherein each X is selected from the group consisting of halogen, alkyl of not more than four carbon atoms, and alkoxy of not more than four carbon atoms, and $n$ is an integer from 0 to 2 inclusive; and a reactant selected from the group consisting of RCHO and RCOOH; by passing said reactants in vapor phase, together with gaseous hydrogen, over a catalyst bed of a metal selected from the group consisting of ruthenium, rhodium, palladium, osmium, iridium and platinum, on a catalyst support; to produce a 2-substituted benzoxazole of the formula:

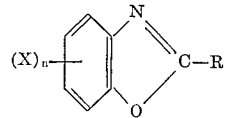

wherein X and $n$ are as defined above, and R is selected from the group consisting of alkyl of not more than 12 carbon atoms, aryl of not more than 12 carbon atoms and aralkyl of not more than 12 carbon atoms.

2. Process of claim 1 wherein the vaporous mixture of reactants and gaseous hydrogen are passed over the catalysts bed at a temperature from 230° C. to 450° C.

3. Process of claim 1 wherein the vaporous mixture of reactants and gaseous hydrogen are passed over the catalyst bed at a temperature from 300° C., to 350° C.

4. A process in accordance with claim 1 wherein the gaseous hydrogen is present in excess of stoichiometric proportions and constitutes an entraining stream for said reactants.

5. A process in accordance with claim 2 wherein the o-nitrophenol reactant is selected from the group consisting of o-nitro-p-cresol, 2-nitro-4-methoxyphenol, 2-nitro-4,5-dimethylphenol, and 2-nitro-4-chlorophenol.

6. A process in accordance with claim 3 wherein the aldehyde reactant is benzaldehyde.

7. A process in accordance with claim 3 wherein the carboxylic acid reactant is acetic acid.

8. A process in accordance with claim 2 wherein the catalyst metal is palladium.

References Cited

Elderfield, Heterocyclic Compounds, vol. 5, (New York, 1957), pages 422–424.

ALTON D. ROLLINS, *Primary Examiner.*

U.S. Cl. X.R.

260—999